United States Patent

Mazzarins

[15] 3,659,669
[45] May 2, 1972

[54] SUSPENSION SYSTEM FOR CRAWLER TRACTOR

[72] Inventor: Janis Mazzarins, Macedonia, Ohio
[73] Assignee: General Motors Corporation, Detroit, Mich.
[22] Filed: Oct. 16, 1970
[21] Appl. No.: 81,473

[52] U.S. Cl. ................................180/9.5, 305/10, 305/22
[51] Int. Cl. ........................................................B62d 55/14
[58] Field of Search ................180/9.2 R, 9.5, 9.52; 305/10, 305/21, 22, 23, 27

[56] References Cited

UNITED STATES PATENTS

| 2,452,671 | 11/1948 | Merrill | 305/10 X |
| 3,142,352 | 7/1964 | Johansson | 180/9.2 X |
| 3,343,889 | 9/1967 | Bexten | 305/22 X |
| 3,375,944 | 4/1968 | Bexten | 305/10 X |
| 2,682,927 | 7/1954 | Leveke | 180/9.5 |
| 2,837,380 | 6/1958 | Mazzarins | 305/10 |

FOREIGN PATENTS OR APPLICATIONS

| 308,451 | 2/1969 | Sweden | 305/23 |
| 628,190 | 8/1949 | Great Britain | 305/22 |

Primary Examiner—Richard J. Johnson
Attorney—J. L. Carpenter and E. J. Biskup

[57] ABSTRACT

A suspension system for a crawler tractor having a wheel carrier located on each side of the tractor. Each wheel carrier is supported by the tractor frame for independent oscillation about an axis extending transversely to the longitudinal axis of the tractor and carries a pair of large diameter wheels.

6 Claims, 3 Drawing Figures

PATENTED MAY 2 1972

3,659,669

INVENTOR.
Janis Mazzarins
BY
E. J. Biskup
ATTORNEY

SUSPENSION SYSTEM FOR CRAWLER TRACTOR

The majority of crawler tractors presently manufactured include a main frame adapted to be supported on a pair of laterally spaced and longitudinally extending roller frames. Each of the roller frames rotatably supports a plurality of track rollers which serve to support the weight of the tractor and provide positive track alignment. The rear end of each roller frame is supported in a manner so as to permit it to pivot relative to the other roller frame as the vehicle negotiates irregular terrain thereby maintaining constant drive irrespective of ground conditions.

Although various improvements have been made to the design of the track rollers over the years, it has been found that frequent replacement and repair of the rollers is necessary in order to maintain the tractor in proper operating condition. As should be apparent, such replacement and servicing of the track rollers is a large expense during the life of a crawler tractor and, accordingly, it has been proposed to eliminate the usual track rollers and substitute therefor large diameter wheels, the cost of maintenance of which would be substantially less than that of the presently utilized track rollers.

The present invention is directed to a crawler tractor having large diameter wheels and more particularly to a suspension system for supporting the wheels so as to permit the vehicle to maintain track contact with the ground under most conditions of operation. More specifically, the present invention contemplates a suspension for a crawler tractor that includes a wheel carrier supporting a pair of large diameter track wheels for rotation about a pair of axially spaced axes, each of which is parallel to the axis of rotation of the drive sprocket. The wheel carriers are located on opposite sides of the tractor and are supported by the tractor frame to permit independent oscillation thereof about a horizontal axis extending transversely to the longitudinal axis of the tractor. The oscillation of each wheel carrier is provided through an arrangement which includes a pair of vertically spaced rollers mounted on the wheel carrier and adapted to respectively engage the upper and lower surfaces of a longitudinally extending and vertically oriented support bar which forms a part of the tractor main frame. Tensioning of the endless track entrained about the usual drive sprocket and the large diameter track wheels is provided by a track adjusting device which is pivotally mounted between the wheel carrier and the main frame.

The objects of the present invention are to provide a suspension system for a crawler tractor utilizing large diameter wheels and in which at least two wheels on each side of the tractor are rotatably mounted on a subframe which is carried by the main frame of the tractor for oscillation about an axis extending transversely to the longitudinal axis of the tractor; to provide a wheel suspension for a crawler tractor which includes a wheel carrier supporting a pair of large diameter wheels, one of which is the idler wheel; to provide a crawler tractor having a frame including a longitudinally extending bar located on each side of the tractor and adapted to pivotally support a wheel carrier having a pair of large diameter wheels; and to provide a large diameter wheel carrier for a crawler tractor that is capable of oscillating about a transverse axis and is movable longitudinally by a track adjusting device for tensioning the track.

Other objects and advantages of the present invention will be more apparent from the following detailed description when taken with the drawing in which.

Figure 1:
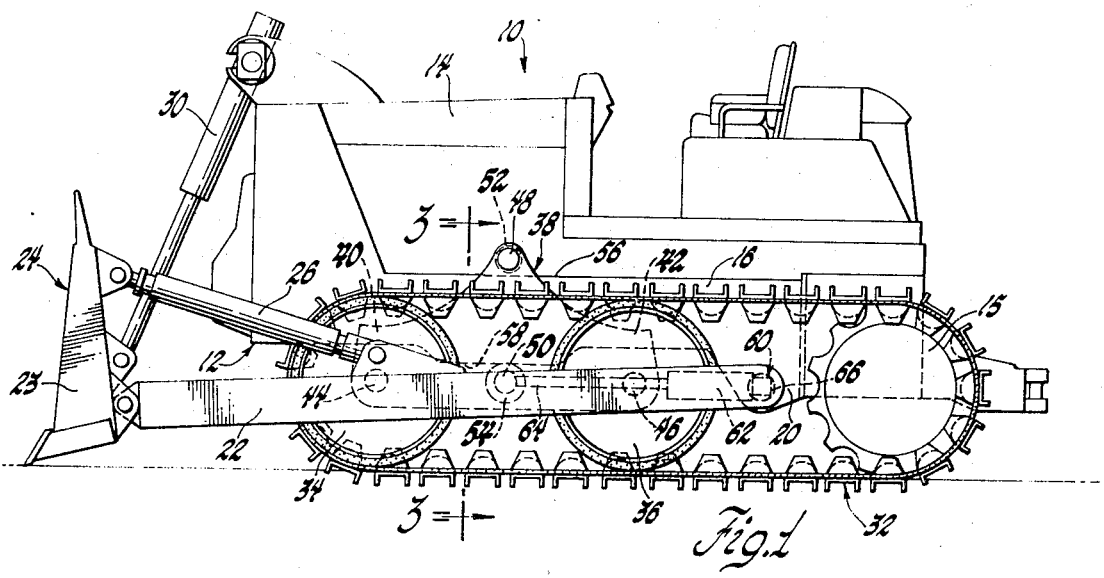
FIG. 1 is a side elevational view showing a crawler tractor incorporating a suspension system made in accordance with the invention.
Figure 2:
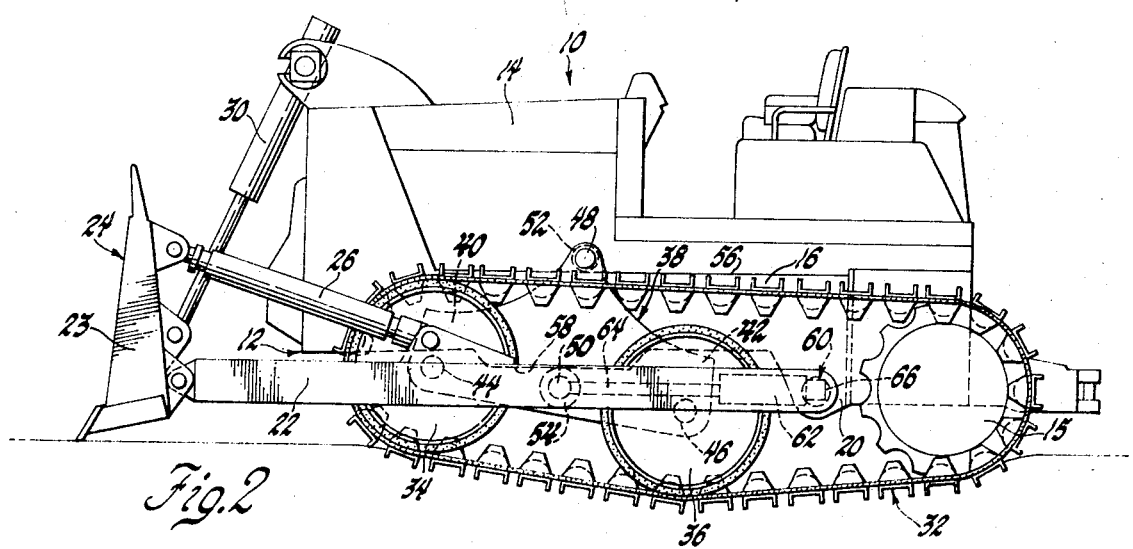
FIG. 2 is a view similar to FIG. 1 but shows the suspension system made according to the invention located in another position.
Figure 3:
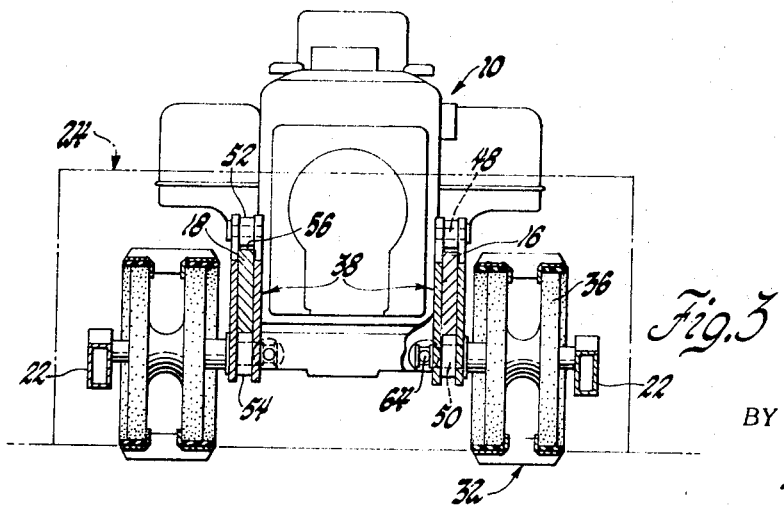
FIG. 3 is a sectional view taken on line 3—3 of FIG. 1.

Referring to the drawing and particularly FIG. 1 thereof, a crawler tractor 10 is shown comprising the usual main frame 12, the front end of which has an engine compartment 14 having a conventional internal combustion engine (not shown) that provides drive through a suitable transmission to a pair of laterally spaced drive sprockets, one of which only is shown and identified by the reference numeral 15. The main frame 12 includes a pair of laterally spaced, vertically orientated, and longitudinally extending support bars 16 and 18, each of which is located along one side of the tractor as best seen in FIG. 3. As seen in FIGS. 1 and 2, each support bar 16 and 18 has the rear end thereof formed with a downwardly extending frame section 20 which is rigidly connected with the usual sprocket housing and serves as a support for the rear portions of a pair of laterally spaced push arms 22 which extend forwardly for pivotal connection with a moldboard 23 of a bulldozer assembly 24. In this instance, each push arm 22 is combined with an adjustable tilt strut 26 for pitching the moldboard 23 about a transverse axis, and a lift jack 30 is centrally mounted between the front end of the tractor 10 and the lower rear end of the moldboard 23 for raising the bulldozer assembly about its pivotal connection with section 20 of the tractor main frame 12.

Each drive sprocket 15 is adapted to drive an endless track 32 which is entrained about a pair of large diameter wheels 34 and 36 rotatably mounted on a subframe member or wheel carrier 38. As seen in FIG. 3, each of the support bars 16 and 18 has a wheel carrier 38 connected thereto and in this regard, it will be noted that each wheel carrier 38 comprises front and rear plate sections 40 and 42 which straddle the associated support bar and are rigidly held together at their lower ends by spindles 44 and 46 supporting wheels 34 and 36. Additional support is provided for the plate sections 40 and 42 by pins 48 and 50 which respectively carry upper and lower rollers 52 and 54. The rollers 52 and 54 serve to engage upper and lower surfaces 56 and 58, respectively, of the support bar.

A track tensioner or adjusting device 60 is combined with each wheel carrier 38 and comprises relatively movable cylinder and piston members 62 and 64. As seen in FIGS. 1 and 3, the cylinder member 62 is connected by a pivotal connection 66 to the frame section 20 of the tractor in axial alignment with and on the opposite side of the pivotal connection supporting the rear end of push arm 22. The piston member 64, on the other hand, is pivotally connected to the wheel carrier 38 at a point axially aligned with the pin 50 supporting the lower roller 54.

From the above description, it should be apparent that the arrangement is such that when the crawler tractor 10 is operating on flat ground, the wheel carrier 38 assumes the position shown in FIG. 1 with the lower roller 54 engaging the lower surface 58 of the associated support bar. When the tractor 10 is driven over an area having a valley or rut as shown in FIG. 2, the wheel carrier 38 will pivot as a unit about a transverse horizontal axis and cause the wheel 34 to rise while the wheel 36 drops so as to maintain track engagement with the ground. In order to permit the wheel carrier 38 to oscillate or pivot about the aforementioned axis, it will be noted that the distance between the opposed surfaces of the upper and lower rollers 52 and 54 is slightly greater than the vertical dimension between the surfaces 56 and 58 of each support bar 16 and 18. As a consequence, when the tractor 10 is in the position of FIG. 1, the forward weight of the tractor is supported on the lower roller 54 and the upper roller 52 is not in contact with the upper surface of the support bar. In other words, some clearance exists between the upper roller 52 and the upper surface 56 so as to permit the oscillation of the wheel carrier 38 described above.

The tensioning device 60 can be of the type shown in my U.S. Pat. No. 2,837,380, which is assigned to the assignee of this invention and consists of a nitrogen gas recoil cylinder and hydraulic track adjuster. This amounts to a two-part construction so that on the reaction side of the piston, nitrogen absorbs all shocks and on the return side semi-fluid grease stops and retains the position of the piston and, accordingly, maintains track tension.

Various changes and modifications can be made in this construction without departing from the spirit of the invention. Such changes and modifications are contemplated by the inventor and he does not wish to be limited except by the scope of the appended claims.

I claim:

1. A suspension system for a crawler tractor having a main frame including a vertically disposed support bar located at each side of said tractor and extending along an axis parallel to the longitudinal axis of said crawler tractor, upper and lower surfaces formed on each support bar, a drive sprocket assembly having a housing rigidly secured to said main frame at the rear thereof, a sprocket wheel mounted on the outer end of said housing and spaced from said main frame, said suspension system including a wheel carrier operatively associated with each support bar for supporting a pair of large diameter track wheels for rotation about a pair of longitudinally spaced axes each of which is parallel to the axis of rotation of said sprocket wheel, a pair of vertically spaced rollers rotatably supported by said wheel carrier, one of said rollers engaging the lower surface of said support bar and supporting a portion of the weight of the tractor, the other of said rollers being located adjacent the upper surface and normally spaced therefrom so as to permit limited pivotal movement of said wheel carrier about an axis extending transversely to said longitudinal axis when the tractor is traveling over irregular terrain, an endless track entrained about said sprocket wheel and said track wheels, and a track adjusting device pivotally mounted between said wheel carrier and said main frame for tensioning said endless track.

2. The suspension system of claim 1 wherein said track adjusting device comprises relatively movable piston and cylinder members, the longitudinal axis of which is parallel to the longitudinal axis of the crawler tractor, means pivotally connecting the cylinder member to said main frame, and means pivotally connecting the piston member to the wheel carrier at a point axially aligned with the rotational axis of said one of said rollers.

3. The suspension system of claim 1 wherein the axes of rotation of said rollers are located along a line which is normal to a line passing through the axes of rotation of said track wheels.

4. The suspension system of claim 1 wherein the axes of rotation of said rollers are located in a vertical plane when the crawler tractor is on a flat level surface.

5. The suspension system of claim 1 wherein the axes of rotation of said track wheels and the axis of rotation of said one of said rollers are located along a straight line which lies in a substantially horizontal plane when the crawler tractor is on a flat level surface.

6. The suspension system of claim 1 wherein the axis of rotation of said one of said rollers is located substantially midway between the axes of rotation of said track wheels.

* * * * *